(12) United States Patent
Couto et al.

(10) Patent No.: US 8,070,196 B2
(45) Date of Patent: Dec. 6, 2011

(54) BUMPER MOUNTING ASSEMBLIES AND VEHICLES INCORPORATING SAME

(75) Inventors: Wally Couto, Burlington (CA); John Goddard, Burlington (CA)

(73) Assignee: MMC Technologies, Inc., Oakville, Ontario (CA)

( * ) Notice: Subject to any disclaimer, the term of this patent is extended or adjusted under 35 U.S.C. 154(b) by 155 days.

(21) Appl. No.: 12/576,882

(22) Filed: Oct. 9, 2009

(65) Prior Publication Data

US 2010/0026019 A1 Feb. 4, 2010

(51) Int. Cl.
*B60R 19/38* (2006.01)

(52) U.S. Cl. ....................................... 293/118

(58) Field of Classification Search .................. 293/118, 293/117; 296/37.2; 224/402, 42.23, 42.21, 224/531, 924, 512; 414/466, 463
See application file for complete search history.

(56) References Cited

U.S. PATENT DOCUMENTS

| | | | | |
|---|---|---|---|---|
| 4,020,920 A | * | 5/1977 | Abbott | 182/19 |
| 4,070,645 A | * | 1/1978 | Oreluk | 340/436 |
| 4,304,056 A | * | 12/1981 | Watson et al. | 37/233 |
| 4,410,117 A | * | 10/1983 | Crawford et al. | 224/490 |
| 4,962,598 A | * | 10/1990 | Woolhiser et al. | 37/231 |
| 5,193,296 A | * | 3/1993 | Reilley | 37/231 |
| 6,059,155 A | * | 5/2000 | Young | 224/42.12 |
| 6,396,395 B1 | * | 5/2002 | Zielinski et al. | 340/425.5 |
| 6,894,604 B2 | * | 5/2005 | Phillips et al. | 340/433 |
| 7,086,673 B2 | * | 8/2006 | Connett et al. | 293/118 |
| 2009/0091113 A1 | * | 4/2009 | Bradley et al. | 280/762 |
| 2009/0139442 A1 | * | 6/2009 | Bradley et al. | 116/28 R |

* cited by examiner

*Primary Examiner* — Kiran B. Patel
(74) *Attorney, Agent, or Firm* — Steven M. Greenberg, Esq.; Carey, Rodriguez, Greenberg & O'Keefe, LLP

(57) ABSTRACT

A bumper mounting assembly comprises a support member mountable to a vehicle front and a bumper-carrying member hingedly mounted to the support member to be movable between an upright position and a lowered position. A primary actuator is secured to the support member and the bumper-carrying member and can apply braking force against movement of the bumper-carrying member from the upright position to the lowered position and can preferably move the bumper-carrying member from the lowered position to the upright position. One of the bumper-carrying member and the support member carries a detent and the other carries a movable latch and a latch actuator for moving the latch between an engagement position and a disengagement position, with the latch biased into the engagement position so that the latch can selectively retain the bumper-carrying member in the upright position. A system to maintain pressure in a spare tire is also described.

8 Claims, 12 Drawing Sheets

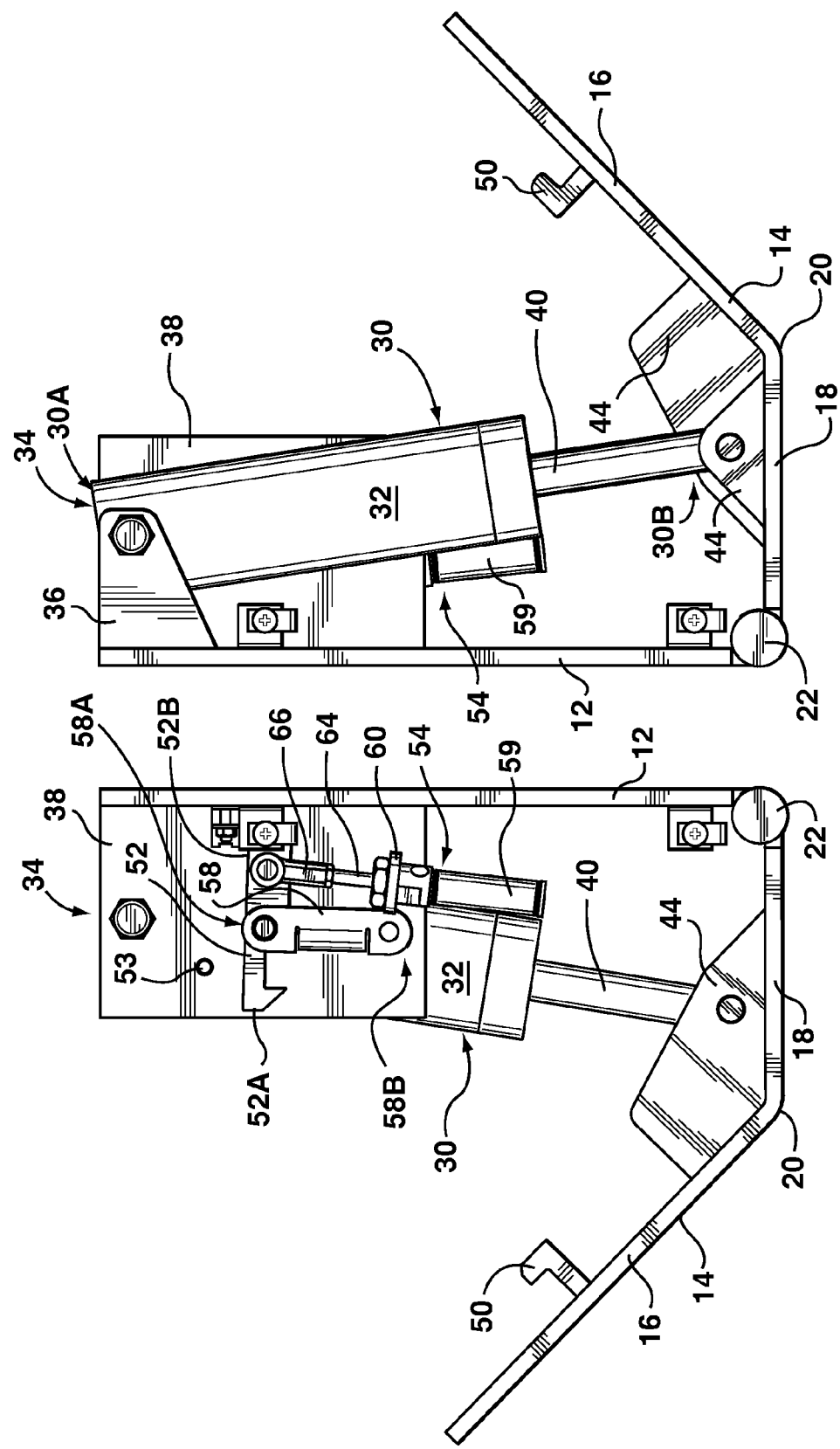

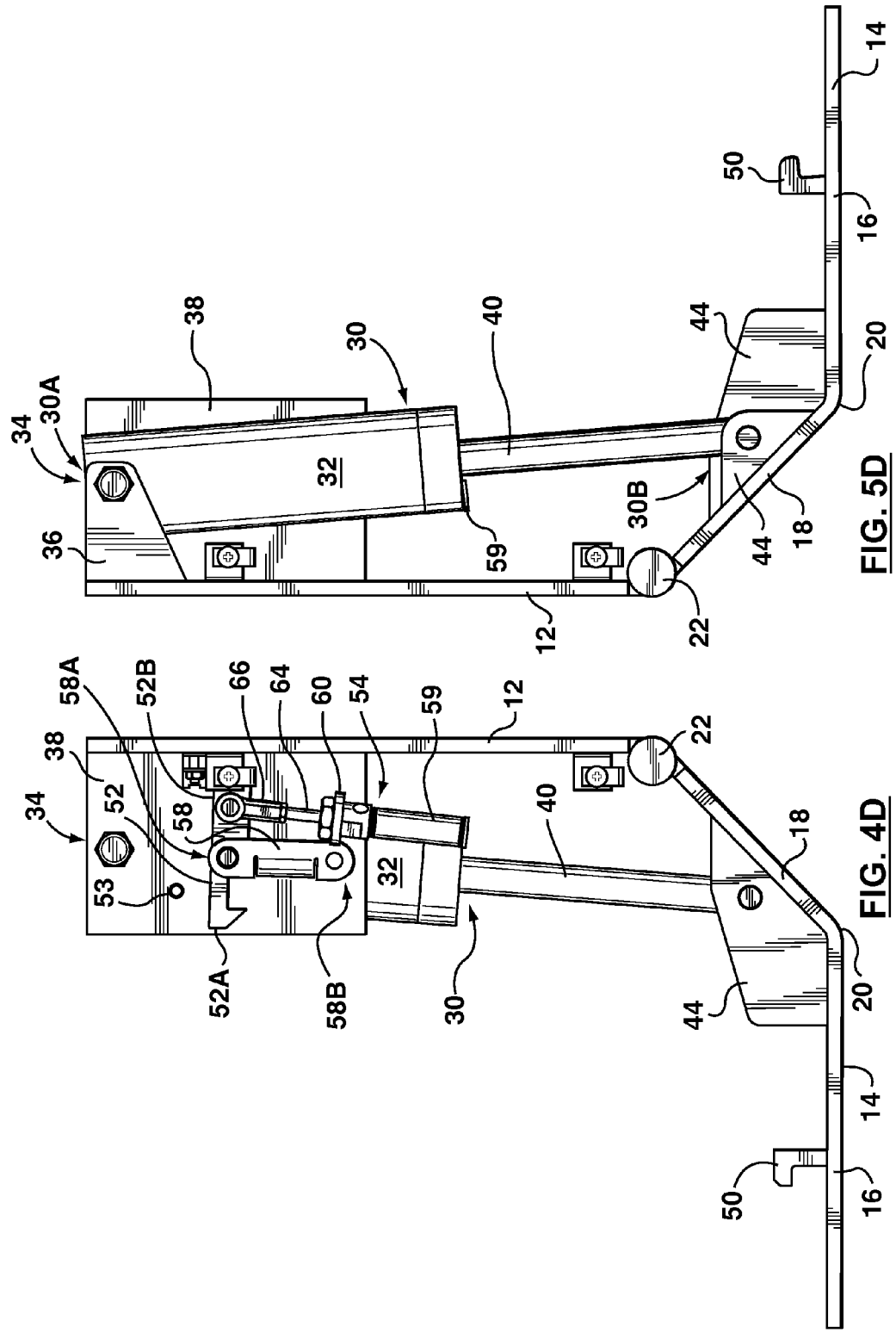

BUMPER MOUNTING ASSEMBLIES AND VEHICLES INCORPORATING SAME

FIELD OF INVENTION

The present invention relates to vehicle bumpers, and more particularly to a mounting assembly for vehicle bumpers.

BACKGROUND OF THE INVENTION

In many conventional motor coach buses, that is, buses which are used for long distance travel, it is conventional to provide a spare tire storage compartment immediately aft of the front bumper. The front bumper is hingedly mounted to the front of the motor coach bus body so that it can pivot downwardly to expose the spare tire compartment, and is maintained in an upright position by fasteners.

To lower the bumper and expose the spare tire, an operator must position him or her self in front of the bumper to disable the fastener, potentially risking injury as the bumper pivots downward under its own weight.

SUMMARY OF THE INVENTION

In one aspect, the present invention is directed to a bumper mounting assembly. The bumper mounting assembly comprises a support member mountable to a vehicle front and a bumper-carrying member which comprises a bumper-mounting portion and a spacer portion. The spacer portion of the bumper-carrying member is hingedly mounted to the support member so that the bumper-carrying member is movable between an upright position and a lowered position, relative to the support member. The bumper-mounting portion is spaced from the support member when the bumper-carrying member is in the upright position. A primary actuator is secured to the support member and the bumper-carrying member, and is at least selectively operable to apply braking force against movement of the bumper-carrying member from the upright position to the lowered position. One of the bumper-carrying member and the support member carries a detent, and the other carries a latch and a latch actuator. The latch is movable between an engagement position and a disengagement position relative to the detent so that the latch can selectively engage and disengage from the detent and thereby selectively retain the bumper-carrying member in the upright position and release the bumper-carrying member from the upright position, and the latch is biased into the engagement position. The latch actuator is coupled to the latch for selectively moving the latch between the engagement position and the disengagement position.

In a preferred embodiment, the primary actuator is selectively operable to move the bumper-carrying member from the lowered position to the upright position.

The bumper mounting assembly preferably includes a switching mechanism operably coupled to the primary actuator and to the latch actuator to selectively reduce resistance of the primary actuator to movement of the bumper-carrying member from the upright position to the lowered position while causing the latch actuator to move the latch to the disengagement position.

In a particular embodiment, the primary actuator is a pneumatic cylinder which has a pneumatic cylinder gas flow port and resists extension when its barrel is sufficiently pressurized, and which is pivotally secured at a first end thereof to the support member and at a second end thereof to the bumper-carrying member, and the latch actuator is a pneumatic spring cylinder that is biased into an extended configuration and has a pneumatic spring cylinder gas flow port and resists retraction when its barrel is insufficiently pressurized and moves into a retracted configuration while its barrel is sufficiently pressurized. In a particular implementation of this embodiment, the pneumatic cylinder gas flow port has a first fluid communication path connectable to a source of compressed gas, the pneumatic cylinder gas flow port communicates with the pneumatic spring cylinder gas flow port through a second fluid communication path, and the switching mechanism is operable to selectively switch between: (a) permitting gas flow through the first fluid communication path into the pneumatic cylinder gas flow port while obstructing gas flow from the pneumatic cylinder gas flow port through the second fluid communication path to the pneumatic spring cylinder gas flow port; and (b) obstructing gas flow through the first fluid communication path into the pneumatic cylinder gas flow port while permitting gas flow from the pneumatic cylinder gas flow port through the second fluid communication path to the pneumatic spring cylinder gas flow port. An adjustable vent is preferably provided on the second fluid communication path.

In a particular embodiment, when the bumper-carrying member is in the upright position, the bumper-mounting portion is substantially parallel to the support member, and when the bumper-carrying member is in the lowered position, the bumper-mounting portion is substantially perpendicular to the support member. Preferably, when the bumper-carrying member is in the upright position, the pneumatic cylinder and the pneumatic spring cylinder are disposed between the bumper-carrying member and the support member.

In a particular embodiment, the detent is carried by the bumper-carrying member and the latch and the latch actuator are carried by the support member.

In another aspect, the present invention is directed to a bus. The bus has a bumper mounting region disposed at a front end thereof, two bumper mounting assemblies as described above whose support members are mounted to the bumper mounting region of the bus, and a bumper mounted on the bumper-carrying members of the two bumper mounting assemblies.

In one embodiment, the bus has a compressed air supply system that is in fluid communication through the switching mechanism with the pneumatic cylinder gas flow port.

In a further aspect, the present invention is directed to a wheeled vehicle that has a spare tire compartment. A spare tire is mounted on a wheel and disposed within the spare tire compartment. The spare tire has an inlet valve for inflating the spare tire, and a compressed air supply system on the vehicle has a tire inflation fluid communication path to the inlet valve of the spare tire. The tire inflation fluid communication path is governed by a tire inflation valve movable between a closed position obstructing the tire inflation fluid communication path and an open position permitting airflow through the tire inflation fluid communication path. The inlet valve of the spare tire is in fluid communication with a pressure indicator, and a tire inflation valve controller is operably coupled to the tire inflation valve for moving the tire inflation valve between the closed position and the open position. Preferably, the tire inflation valve is biased into the closed position. Also preferably, a display of the pressure indicator is positioned inside a cabin of the vehicle so as to be visible from a driver's seat of the vehicle, and the tire inflation valve controller is positioned inside the cabin of the vehicle so as to be accessible from the driver's seat of the vehicle.

The vehicle may be a bus having a bumper mounted thereon using bumper mounting assemblies as described above.

BRIEF DESCRIPTION OF THE DRAWINGS

These and other features of the invention will become more apparent from the following description in which reference is made to the appended drawings wherein:

FIG. 4C shows a first side view of the bumper mounting assembly of FIG. 1, in a second intermediate configuration;

FIG. 4D shows a second side view of the bumper mounting assembly of FIG. 1, in a lowered configuration;

FIG. 5C shows a second side view of the bumper mounting assembly of FIG. 1, in a second intermediate configuration;

FIG. 5D shows a second side view of the bumper mounting assembly of FIG. 1, in a lowered configuration;

DETAILED DESCRIPTION

Figure 1:
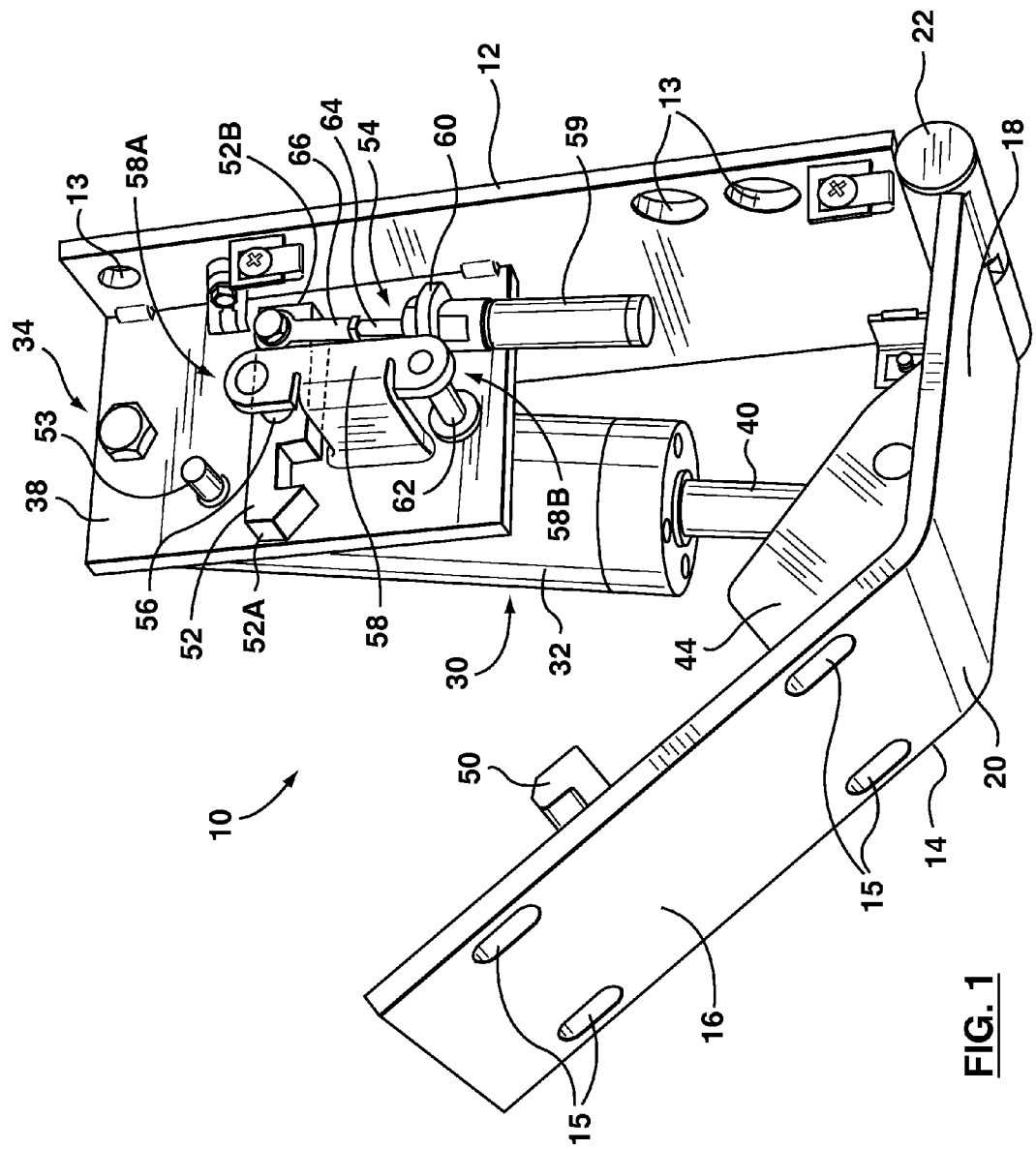
FIG. 1 shows a first perspective view of an exemplary bumper mounting assembly, according to an aspect of the present invention.

With reference now to FIG. 1, an exemplary bumper mounting assembly according to an aspect of the present invention is shown generally at 10. The bumper mounting assembly 10 comprises a support member 12 mountable to a vehicle front (not shown in FIG. 1), and a bumper-carrying member 14. In the illustrated embodiment, the support member 12 is generally planar, and the bumper-carrying member 14 comprises a generally planar bumper-mounting portion 16 and a generally planar spacer portion 18. More particularly, in the exemplary illustrated embodiment, the bumper-carrying member 14 comprises a single planar member having a bend 20 which defines the junction between the bumper-mounting portion 16 and the spacer portion 18. Apertures 13 are provided in the support member 12 for securing the support member to a bumper mounting region of a motor coach bus, and apertures 15 are provided in the bumper-mounting portion 16 for securing a bumper thereto. In a typical installation, a motor coach bus 200 will have a bumper mounting region 202, two bumper mounting assemblies 10 will be mounted on the bumper mounting region 202, and a bumper 208 will be mounted on the bumper-carrying members 14 of the two bumper mounting assemblies 10 (see FIGS. 2 and 3).

Figures 4A, 5A:
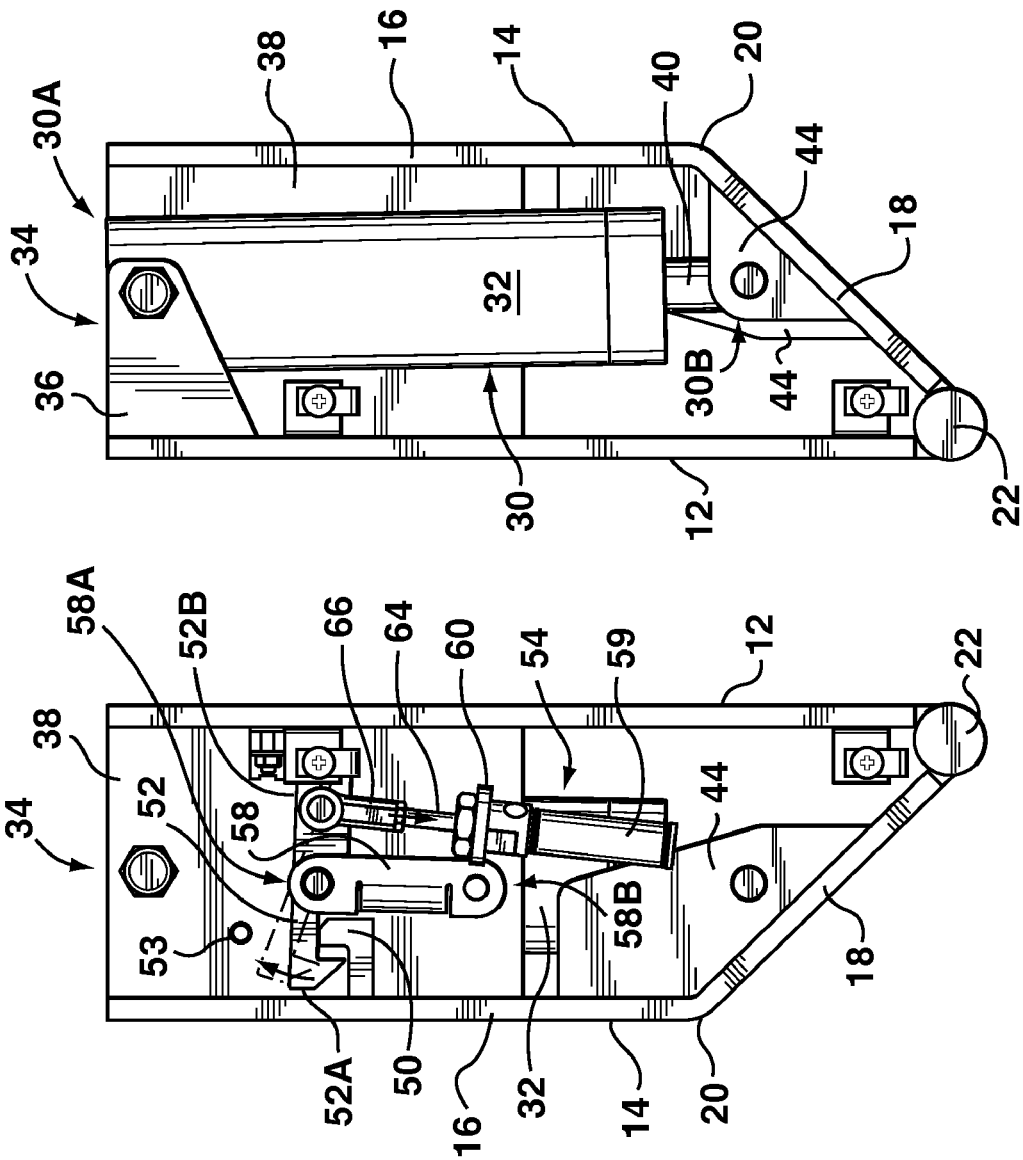
FIG. 4A shows a first side view of the bumper mounting assembly of FIG. 1, in an upright configuration.
FIG. 5A shows a second side view of the bumper mounting assembly of FIG. 1, in an upright configuration.

Continuing to refer to FIG. 1, the bumper-carrying member 14 is hingedly mounted to the support member 12 by way of a hinge 22 so that the bumper-carrying member 14 is movable between an upright position (see FIGS. 4A and 5A) and a lowered position (see FIGS. 4D and 5D), in each case relative to the support member 12. Thus, the bumper mounting assembly 10 has an upright configuration and a lowered configuration. Because of the spacer portion 18 and the angle between the spacer portion 18 and the bumper-mounting portion 16, as defined by the bend 20, when the bumper-carrying member 14 is in the upright position, as shown in FIGS. 4A and 5A, the bumper-mounting portion 16 is spaced from, and substantially parallel to, the support member 12, and when the bumper-carrying member 14 is in the lowered position, as shown in FIGS. 4D and 5D, the bumper-mounting portion 16 is substantially perpendicular to the support member 12.

Figure 8A:
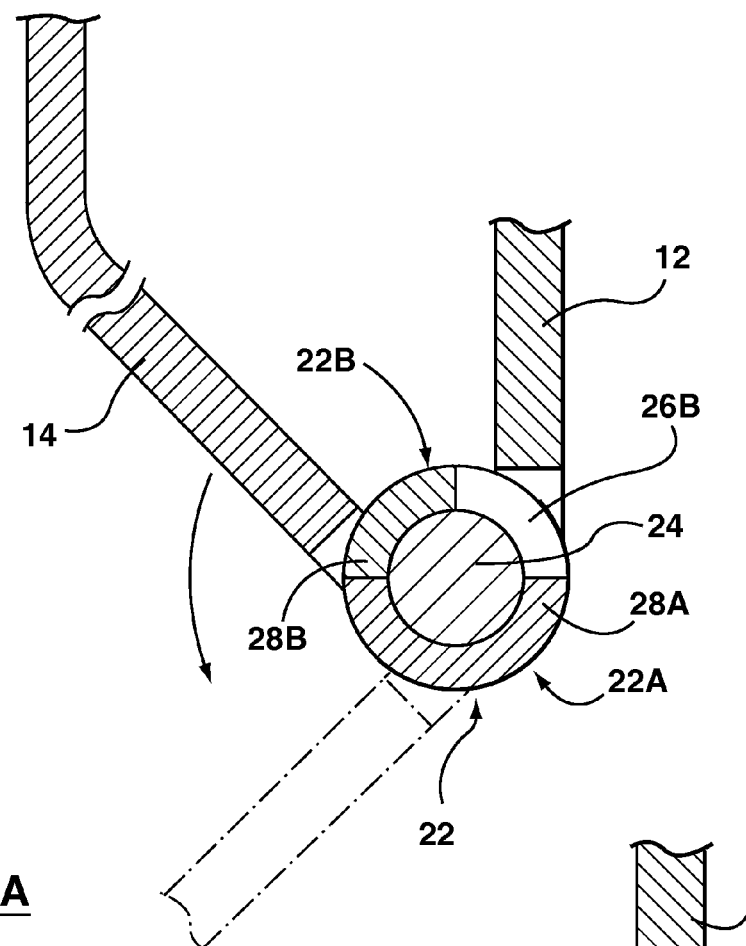
FIG. 8A shows a detailed view of a hinge of a bumper mounting assembly according to an aspect of the present invention, with the bumper mounting assembly in an upright configuration.
Figure 8B:
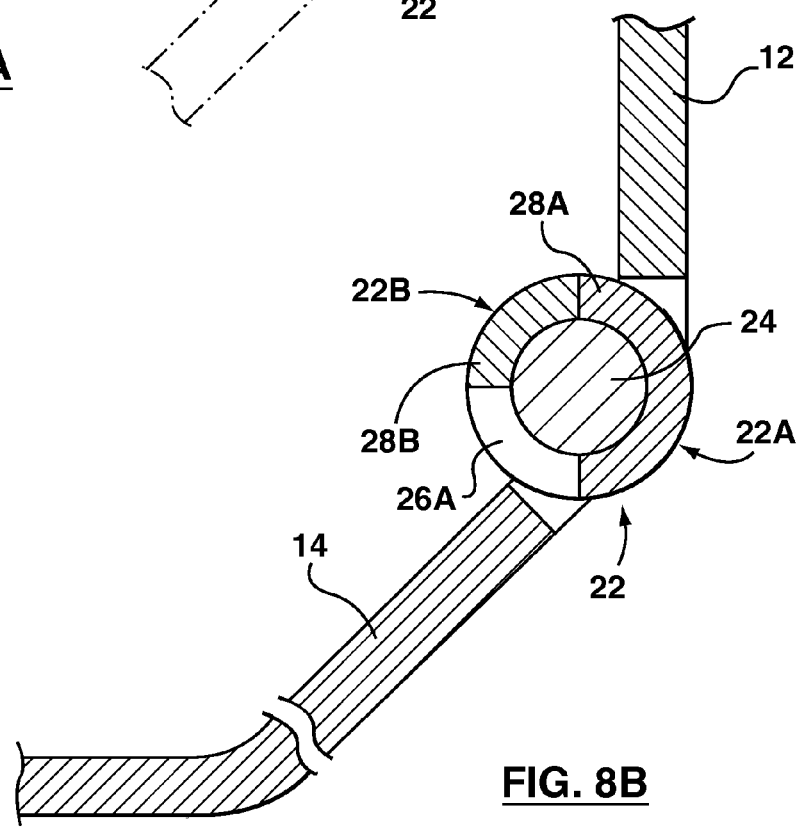
FIG. 8B shows the hinge of FIG. 8A, with the bumper mounting assembly in a lowered configuration.

As can be seen in FIGS. 8A and 8B, the hinge 22 comprises two complementary hinge halves 22A, 22B and a pin 24, and hinge halves 22A, 22B can rotate relative to one another about the pin 24. The hinge 22 is a limiting hinge, and each hinge half 22A, 22B has a respective notch 26A, 26B into which can be received a corresponding projection 28A, 28B on the other hinge half 22A, 22B. The notches 26A, 26B and projections 28A, 28B cooperate to limit rotation of the hinge halves 22A, 22B and thereby prevent the bumper-carrying member 14 from moving past the lowered position. In other words, the limit of the hinge 22 defines the lowered position of the bumper-carrying member 14, relative to the support member 12.

Returning to FIG. 1, a primary actuator is secured to the support member 12 and the bumper-carrying member 14, and is at least selectively operable to apply braking force during movement of the bumper-carrying member 14 from the upright position to the lowered position. Preferably, the primary actuator is also selectively operable to move the bumper-carrying member 14 from the lowered position to the upright position and to resist movement of the bumper-carrying 14 member from the upright position to the lowered position. In the illustrated embodiment, the primary actuator is a pneumatic cylinder 30 that is pivotally secured at a first end 30A thereof to the support member 12 and at a second end 30B thereof to the bumper-carrying member 14.

The distal end of the barrel 32 of the pneumatic cylinder 30 (distal from the piston 40) is pivotally secured to a bracket 34 formed on one side by a mounting tab 36 and on the other side by a latch support plate 38 secured to the support member 12. The distal end of the piston 40 of the pneumatic cylinder 30 (distal from the barrel 32) is pivotally secured to a bracket 42 formed by two opposed mounting tabs 44 on the bumper-carrying member 14.

Figure 2:
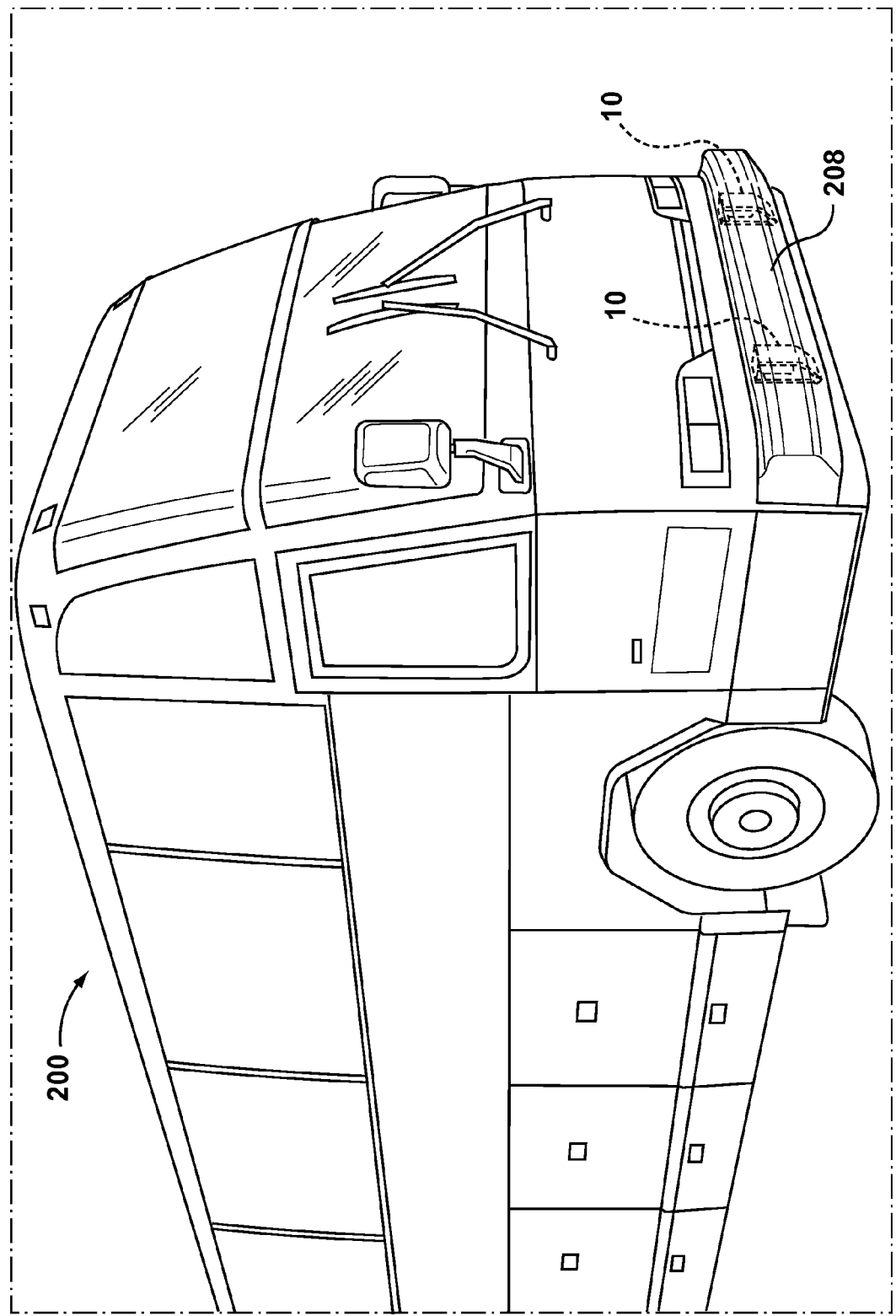
FIG. 2 shows a perspective view of an exemplary motor coach bus having a bumper mounted thereon using bumper mounting assemblies according to an aspect of the present invention, with the bumper in an upright position.
Figure 3:
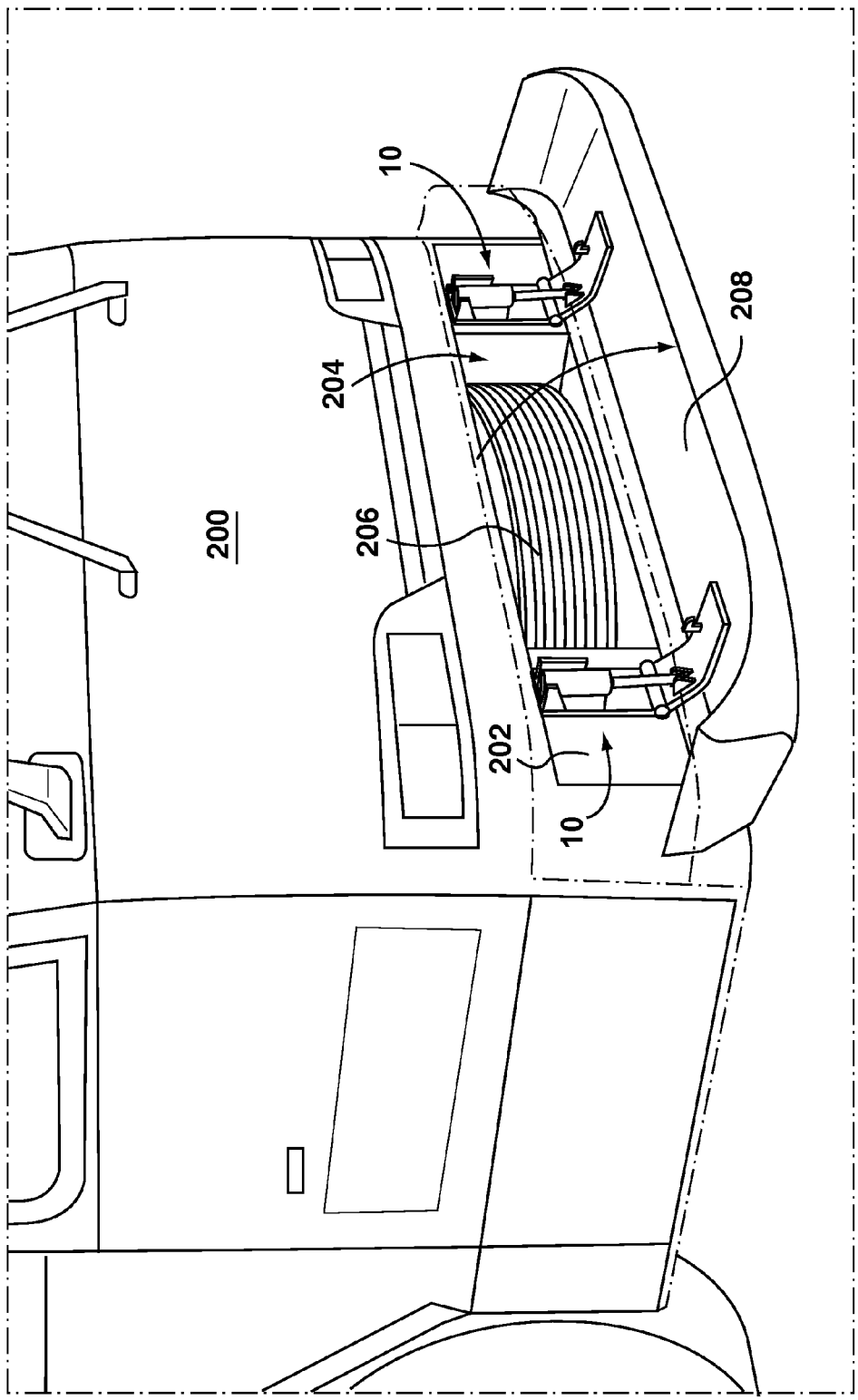
FIG. 3 shows a detailed perspective view of the exemplary motor coach bus of FIG. 2, with the bumper in a lowered position.

The pneumatic cylinder 30 has a pneumatic cylinder gas flow port 46 (see FIGS. 6A and 6B) and resists extension when sufficient gas pressure exists inside the barrel 32. Thus, if (e.g.) compressed air at sufficient pressure, such as from the compressed air supply of a motor coach bus, is supplied to the pneumatic cylinder gas flow port 46 while the pneumatic cylinder 30 is in a retracted configuration, the pneumatic cylinder 30 will resist extension. As such, when the bumper mounting assembly 10 is oriented with the support member 12 vertical and the bumper-carrying member 14 is in the upright position, the pneumatic cylinder 30 can (in cooperation with a second pneumatic cylinder in a second bumper mounting assembly 10 as shown in FIGS. 2 and 3) resist the moment about the hinge 22 generated by the bumper-carrying member 14 (and a bumper attached thereto), and hence resist the tendency of the bumper-carrying member 14 to pivot into the lowered position under the weight of a bumper secured thereto. Thus, the pneumatic cylinder 30 can resist movement of the bumper-carrying member 14 from the upright position to the lowered position, and will thereby maintain the bumper-carrying member 14 in the upright position when the barrel 32 is sufficiently pressurized. In addition, when sufficient gas pressure is provided inside the barrel 32 while the pneumatic cylinder 30 is in an extended configuration, such as when the bumper-carrying member 14 is in the lowered position, the pneumatic cylinder 30 can (in cooperation with a second pneumatic cylinder 30 in a second bumper mounting assembly 10 as shown in FIGS. 2 and 3) also raise the bumper-carrying member 14 from the lowered position to the upright position. In the illustrated embodiment, the pneumatic cylinder 30 is a model NCGBN63-0600 cylinder offered by SMC Corporation of America, having an address at 10100 SMC Blvd., Noblesville, Ind. 46060, USA.

The bumper-carrying member 14, more particularly the bumper-mounting portion 16 thereof, carries a detent 50 on its inner face, that is, the surface which faces the support member 12. The support member 12 movably carries a correspondingly positioned latch 52 having an engagement head 52A that is engageable with the correspondingly shaped detent 50. The latch 52 is movable between an engagement position (shown in solid lines in FIG. 4A) and a disengagement position (shown in dotted lines in FIG. 4A) relative to the detent 50 when the bumper-carrying member 14 is in the upright position. The support member 12 also carries a latch actuator 54 coupled to the latch 52 for selectively moving the latch 52 between the engagement position and the disengagement position. In the illustrated embodiment, the latch actuator 54 is a pneumatic spring cylinder 54, which is biased by its internal spring into an extended configuration.

The latch 52 is pivotally mounted to the latch support plate 38 by way of a pin 56 extending perpendicularly to the latch support plate 38 between the latch support plate 38 and an upper portion 58A of a latch assembly bracket 58 mounted to the latch support plate 38. The pneumatic spring cylinder 54 is also pivotally mounted to the latch support plate 38. In particular, the proximal end of the barrel 59 of the pneumatic spring cylinder 54 (that is, the end proximal to the piston 64 of the pneumatic spring cylinder 54) is secured to a carrier 60 that is pivotally mounted to the latch support plate 38 by way of a pin 62 extending perpendicularly to the latch support plate 38 between the latch support plate 38 and a lower portion 58B of the latch assembly bracket 58. The distal end of the piston 64 (that is, the end remote from the barrel 59 of the pneumatic spring cylinder 54) carries a latch-mounting element 66 that is pivotally mounted to the distal end 52B of the latch 52. A stop 53 projects from the support plate 38 to prevent overtravel by the latch 52 when it moves into the disengagement position.

Because the pneumatic spring cylinder 54 is biased by its internal spring 70 (see FIGS. 6A and 6B) into its extended configuration, the force normally applied by the piston 64 to the distal end 52B of the latch 52 forces the engagement head 52A of the latch 52 to pivot downward about pin 56, thereby biasing the latch 52 into the engagement position. The pneumatic spring cylinder 54 has a pneumatic spring cylinder gas flow port 68 (see FIGS. 6A and 6B). The pneumatic spring cylinder 54 is configured to move into, and remain in, its retracted configuration when sufficient gas pressure exists inside the barrel 59. Hence, by supplying gas at sufficient pressure to the pneumatic spring cylinder gas flow port 68, the latch 52 can be made to selectively engage and disengage from the detent 50 and can thereby selectively retain the bumper-carrying member 14 in the upright position and release the bumper-carrying member 14 from the upright position. In the illustrated embodiment, the pneumatic spring cylinder 54 is a model NCMB075-0100T offered by SMC Corporation of America, having an address at 10100 SMC Blvd., Noblesville, Ind. 46060, USA.

In the illustrated embodiment, when the bumper-carrying member 14 is in the upright position, as shown in FIGS. 4A and 5A, the pneumatic cylinder 30 and the pneumatic spring cylinder 54 are disposed between the bumper-carrying member 14 and the support member 12.

In the illustrated embodiment, the detent 50 is carried by the bumper-carrying member 14, and the latch 52 and the pneumatic spring cylinder 54 are carried by the support member 12. In alternate embodiments, a bumper mounting assembly according to aspects of the present invention may be configured with a detent being carried by the support member 12 and the latch and latch actuator being carried by the bumper-carrying member 14.

As noted above, the pneumatic cylinder 30 resists extension and maintains the bumper-carrying member 14 in the upright position when receiving sufficient gas pressure at the pneumatic cylinder gas flow port 46. In addition, the pneumatic spring cylinder 54 will move into its retracted configuration while receiving sufficient gas pressure at the pneumatic spring cylinder gas flow port 68, thereby moving the latch 52 into the disengagement position. Merely moving the latch 52 to the disengagement position while the barrel 32 of the pneumatic cylinder 30 is pressurized will not cause the bumper-carrying member 14 to pivot into the lowered position, because the bumper-carrying member 14 is maintained in the upright position by the pneumatic cylinder 30. Similarly, merely venting the barrel 32 of the pneumatic cylinder 30 while the latch 52 engages the detent 50 will not cause the bumper-carrying member 14 to pivot into the lowered position because the bumper-carrying member 14 is retained by the latch 52 and detent 50. However, by simultaneously moving the latch 52 to the disengagement position and venting the barrel 32 of the pneumatic cylinder 30, the bumper-carrying member 14 can be permitted to pivot into the lowered position. Accordingly, when the bumper-carrying member 14 is in the upright position and retained there by the pneumatic cylinder 30 and engagement of the detent 50 with the latch 52, by selectively venting pressure from the barrel 32 of the pneumatic cylinder 30 and simultaneously supplying gas at sufficient pressure to the pneumatic spring cylinder gas flow port 68 of the pneumatic spring cylinder 54, the bumper-carrying member 14 can be released to pivot into the lowered position. FIGS. 4A to 4D and 5A to 5D show the process of lowering the bumper-carrying member 14.

In operation, a switching mechanism is coupled to the bumper mounting assembly 10. Specifically, the switching mechanism is operably coupled to the pneumatic cylinder 30 and to the pneumatic spring cylinder 54 to selectively reduce resistance of the pneumatic cylinder 30 to extension thereof while causing the pneumatic spring cylinder 54 to move the latch to the disengagement position. The switching mechanism may be a purely mechanical mechanism, or an electromechanical mechanism, or any other suitable mechanism.

Figure 6A:
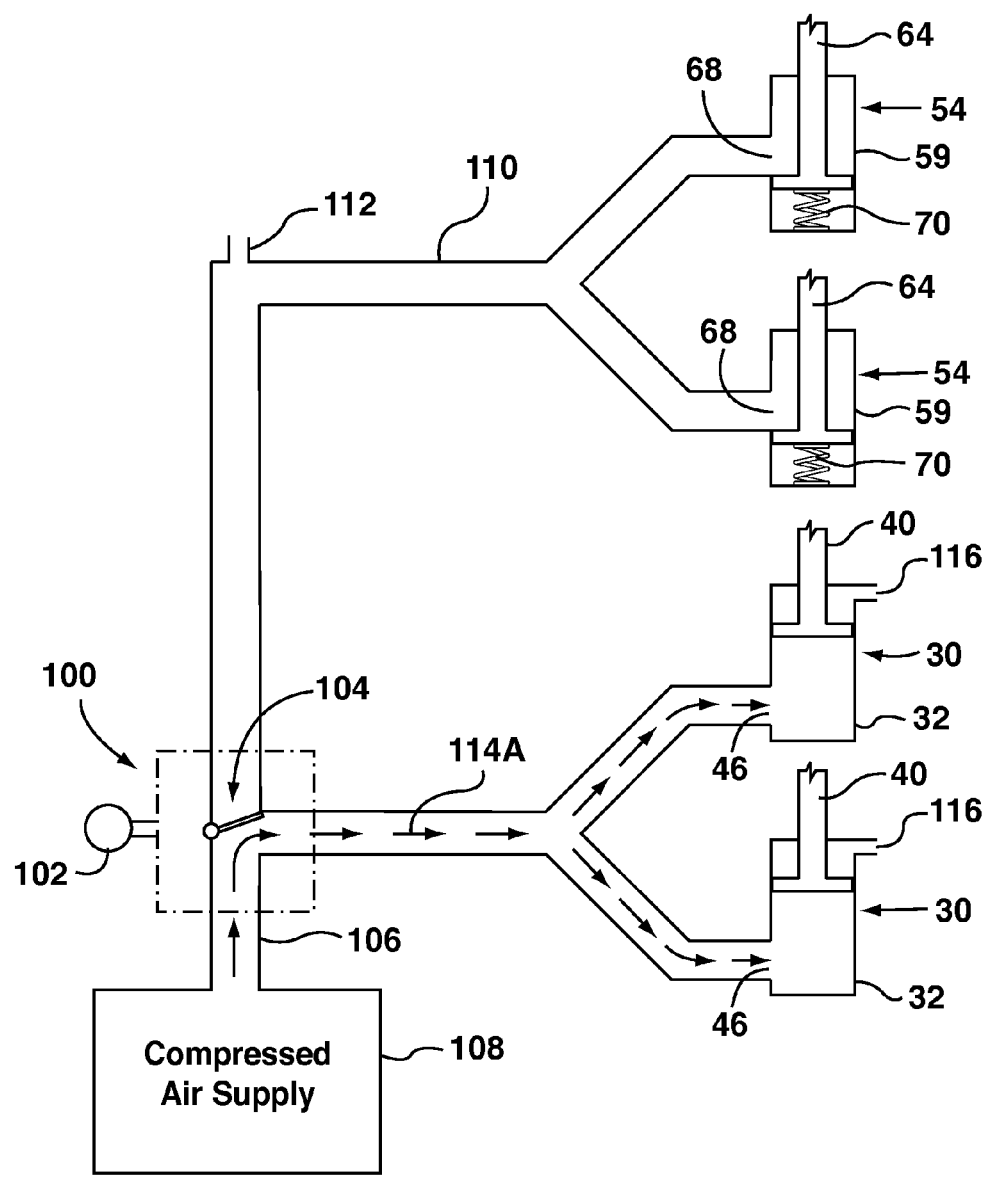
FIG. 6A shows a schematic representation of exemplary interconnections between exemplary pneumatic components of an exemplary bumper mounting assembly according to an aspect of the present invention, with a valve in a first position.
Figure 6B:
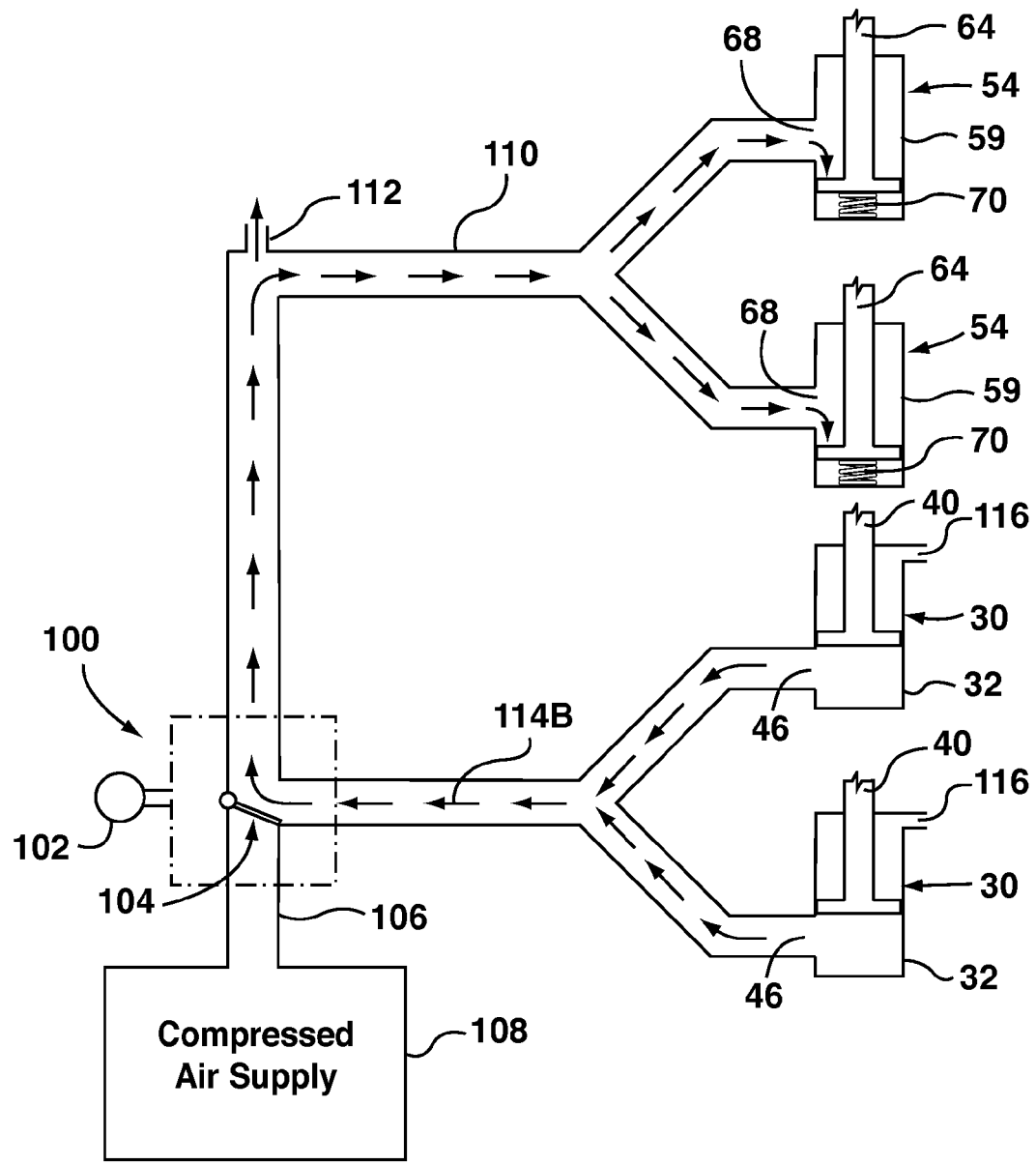
FIG. 6B shows the schematic representation of FIG. 6A, with the valve in a second position.

FIGS. 6A and 6B are component diagrams showing the interconnections between the pneumatic components in an exemplary embodiment of an aspect of the present invention, including fluid communication paths and a switching mechanism for controlling fluid flow along the fluid communication paths. As such, FIGS. 6A and 6B are illustrative of interconnections only, and do not represent physical positions of the pneumatic components. Moreover, non-pneumatic components, such as the mounting member 12, the bumper-carrying member 14, and the latch 52, are not shown in FIGS. 6A and 6B. Furthermore, the components are not shown to scale, and the size of the fluid communication paths is exaggerated substantially, relative to the pneumatic cylinders 30 and the pneumatic spring cylinders 54, for ease of illustration. Suitable flexible tubing may be used to provide the fluid communication paths.

As noted above, a motor coach bus will typically have a bumper mounting region at its forward end, and two bumper mounting assemblies such as those described herein will be mounted on the bumper mounting region of the motor coach bus, and a bumper will be mounted on the bumper-carrying members of the two bumper mounting assemblies (see FIGS. 2 and 3). As such, two pneumatic cylinders 30, and two pneumatic spring cylinders 54, one for each of two bumper mounting assemblies 10, are shown in FIGS. 6A and 6B.

As shown schematically in FIGS. 6A and 6B, the switching mechanism 100 includes a controller 102 that controls a control valve 104. The controller 102 may be a mechanical controller which physically changes the position of the control valve 104 by way of a mechanical linkage, or it may be an electronic or electromechanical controller which transmits a signal to one or more valve actuators that change the position of the control valve 104 in response to the signal from the controller 102. While the control valve 104 is shown schematically in FIGS. 6A and 6B as a movable redirection plate, this is merely for ease of illustration, and any suitable valve may be used.

The pneumatic cylinder gas flow port 46 on each pneumatic cylinder 30 has a first fluid communication path 106 that is connectable to a source of compressed gas, such as the standard compressed air supply system 108 provided on most motor coach buses. In addition, the pneumatic cylinder gas flow port 46 on each pneumatic cylinder 30 communicates with the pneumatic spring cylinder gas flow port 68 on each pneumatic spring cylinder 54 through a second fluid communication path 110. The second fluid communication path 110 includes an adjustable vent 112.

The switching mechanism 100 is operable to selectively switch between two configurations. In the first configuration, as shown in FIG. 6A, gas flow from the compressed air supply system 108 through the first fluid communication path 106 into the pneumatic cylinder gas flow port 46 on each pneumatic cylinder 30 is permitted, as shown by the arrows 114A, while gas flow from the pneumatic cylinder gas flow port 46 on each pneumatic cylinder 30 through the second fluid communication path 110 to the pneumatic spring cylinder gas flow ports 68 on the pneumatic spring cylinders 54 is obstructed by the control valve 104. In the second configuration, as shown in FIG. 6B, gas flow from the pneumatic cylinder gas flow port 46 on each pneumatic cylinder 30 through the second fluid communication path 110 to the pneumatic spring cylinder gas flow ports 68 on the pneumatic spring cylinders 54 is permitted, as shown by the arrows 114B, while gas flow from the compressed air supply system 108 through the first fluid communication path 106 into the pneumatic cylinder gas flow port 46 on each pneumatic cylinder 30 is obstructed by the control valve 104. In both configurations, gas flow directly from the compressed air supply system 108 into and through the second fluid communication path 110 to the pneumatic spring cylinder gas flow ports 68 on the pneumatic spring cylinders 54 is obstructed by the control valve 104.

During normal operation of a motor coach bus, the switching mechanism 100 will be in the first configuration and, as shown in FIG. 6A, compressed air will flow from the compressed air supply system 108 through the first fluid communication path 106 into the pneumatic cylinder gas flow port 46 on each pneumatic cylinder 30, thereby providing sufficient pressure in the barrel 32 of each pneumatic cylinder 30 to resist extension under the weight of the bumper. In addition, because compressed air flow from the pneumatic cylinder gas flow port 46 on each pneumatic cylinder 30, as well as from the compressed air supply system 108, is obstructed by the control valve 104, compressed air does not flow into and through the second fluid communication path 110 to the pneumatic spring cylinder gas flow ports 68 on the pneumatic spring cylinders 54. Therefore, the pneumatic spring cylinders 54 remain in the extended configuration due to the force exerted by their internal springs 70, thereby biasing the latch 52 into the engagement position. Thus, when the switching mechanism is in the first configuration, as shown in FIG. 6A, the bumper-carrying member 14 is retained in the upright position. Moreover, when a motor coach bus is parked, such as overnight, pressure in the compressed air supply system 108 may fall below the level required for the pneumatic cylinders 30 to resist extension, or the compressed air supply system may fail during driving operations. In either case, the bumper-carrying members 14, and hence the bumper, will be retained in the upright position by the latches 52 (see FIG. 4A), since the latches 52 are biased into the engagement position in the absence of air pressure in the barrels 59 of the pneumatic spring cylinders 54.

Figure 5B:
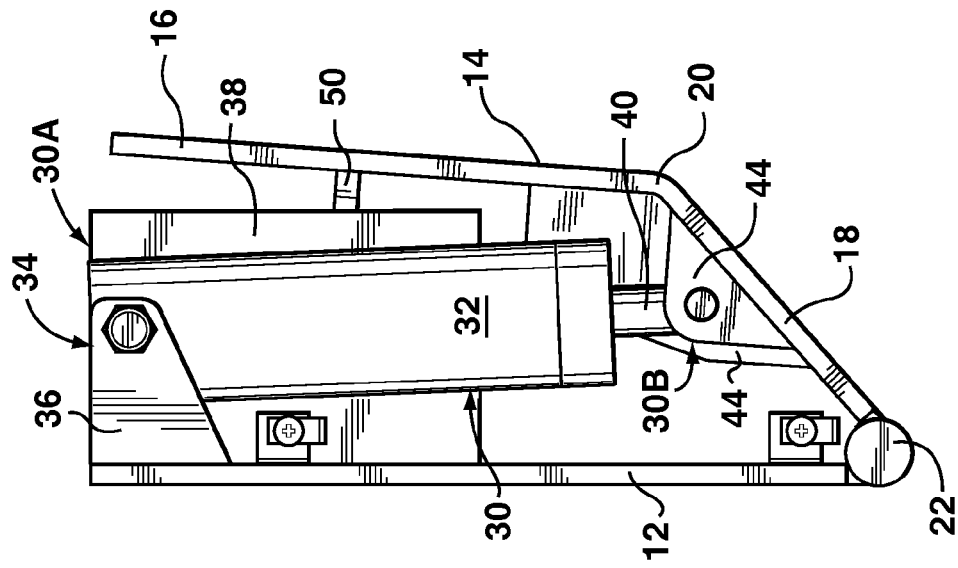
FIG. 5B shows a second side view of the bumper mounting assembly of FIG. 1, in a first intermediate configuration.
Figure 4B:
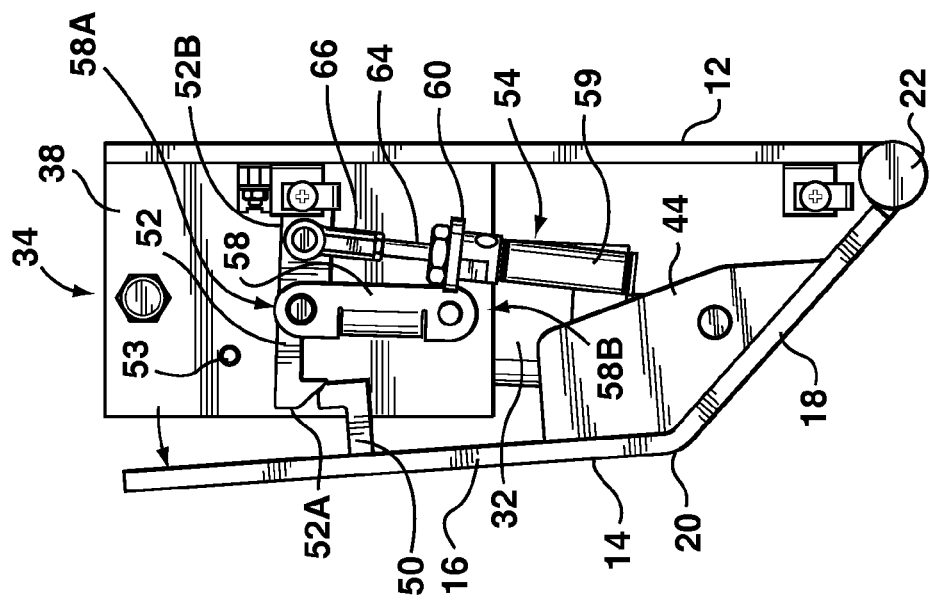
FIG. 4B shows a first side view of the bumper mounting assembly of FIG. 1, in a first intermediate configuration.

When an operator wishes to lower the bumper so as to access the spare tire, he or she will move the switching mechanism 100 to the second configuration, as shown in FIG. 6B. When the switching mechanism 100 is in the second configuration, the pneumatic cylinders 30 are isolated from the compressed air supply system 108, and compressed air inside the pneumatic cylinders 30 travels through the second fluid communication path 110 to the pneumatic spring cylinder gas flow ports 68 on the pneumatic spring cylinders 54, as shown by the arrows 114B. The compressed air enters the barrels 59 of the pneumatic spring cylinders 54 and overcomes the force exerted by their internal springs 70, thereby retracting the pistons 64 and moving the latches 52 into the disengagement position (shown in dotted lines in FIG. 4A). The compressed air vents from the second fluid communication path 110 through the adjustable vent 112, allowing the pneumatic cylinders 30 to extend by providing an escape path for the compressed air that had been in the barrels 32 of the pneumatic cylinders 30. Thus, simultaneously, the latches 52 move into the disengagement position while the resistance provided by the pneumatic cylinders 30 is reduced, permitting the bumper-carrying member 14 to pivot away from the support member 12 enough that the detents 50 move clear of the latches 52, as shown in FIGS. 4B and 5B. Once enough compressed air has escaped through the adjustable vent 112, the pressure inside the barrels 59 of the pneumatic spring cylinders 54 will become low enough for the springs 70 to return the pneumatic spring cylinders 54 to the extended configuration, so that the latch 52 is again biased into the engagement configuration.

Even though the second fluid communication path 110 vents to ambient through the adjustable vent 112, where gas at sufficient pressure (relative to the size of the aperture(s) in the adjustable vent 112) is supplied to the pneumatic spring cylinder gas flow port 68, the pressure inside the barrel 59 will temporarily increase enough to move the pneumatic spring cylinder 54 into its extended configuration and thus move the latch 52 into the disengagement position. Where the pressure of the supplied gas is sufficient, the pneumatic spring cylinder 54 will remain in its extended configuration for long enough to allow the bumper-carrying member 14 to pivot far enough away from the support member 12 (assuming it is so permitted by the pneumatic cylinder 30) that the detent 50 will be free of the latch 52 when the latch 52 returns to the engagement position.

Because the pressure in the barrel 32 of the pneumatic cylinder 30 does not immediately drop to zero, the pneumatic cylinder 30 provides a braking function as its barrel 32 vents, slowing the movement of the bumper-carrying members 14 so that they move gradually into the lowered position, rather than falling abruptly (see FIGS. 4B and 5B and 4C and 5C). As such, the size of the aperture(s) provided by the adjustable vent 112 controls the speed of descent of the for the bumper-carrying members 14. Small apertures 116 are preferably provided in the barrels 32 of the pneumatic cylinders 30 to allow air to enter the cylinder behind the pistons 40 as the pneumatic cylinders 30 extend, and to allow the expulsion of such air when the pneumatic cylinders 30 retract (as described below).

After the spare tire has been installed and the flat tire placed in the spare tire compartment, the operator will move the switching mechanism 100 to the first configuration, as shown in FIG. 6A. As compressed air is provided to the pneumatic cylinders 30, they will retract, moving the bumper-carrying members 14, and hence the bumper 208, back to the upright position. As the detents 50 come into contact with the engagement heads 52A of the latches 52, the force provided by the pneumatic cylinders 30 enables the detents 50 to displace the latches 52 upward against the force supplied by the internal springs 70 in the pneumatic spring cylinders 54 (as shown in dotted lines in FIG. 4A) until the detents 50 move far enough inward for the latches 52 to return to the engagement position.

With reference now to FIGS. 2 and 3, a motor coach bus is shown generally at 200. As can be seen in FIG. 3, the motor coach bus 200 has a bumper mounting region 202 forming part of the body of the motor coach bus 202 and disposed at the front end thereof, with a spare tire compartment 204 recessed within the bumper mounting region 202 and a spare tire 206 disposed in the spare tire compartment 204. Two bumper mounting assemblies 10 as described above are mounted to the motor coach bus 200. In particular, the support members 12 are mounted on the bumper mounting region 202, on either side of the spare tire compartment 204. A bumper 208 of conventional design is mounted on the bumper-carrying members 14 of the two bumper mounting assemblies 10. The switching mechanism 100, preferably located inside the cabin of the motor coach bus 200, within reach of the driver, is operably coupled to the bumper mounting assemblies 10 in the manner described above. Thus, when it is necessary to access the spare tire 206, the operator can use the switching mechanism 100 to actuate the bumper mounting assemblies 100, and thereby lower the bumper 208 so as to provide access to the spare tire compartment 204, as shown in FIG. 3.

Of course, a spare tire is of little value if it, too, is flat. Therefore, according to an aspect of the present invention there is provided an arrangement for maintaining proper air pressure in the spare tire 206.

Figure 7A:
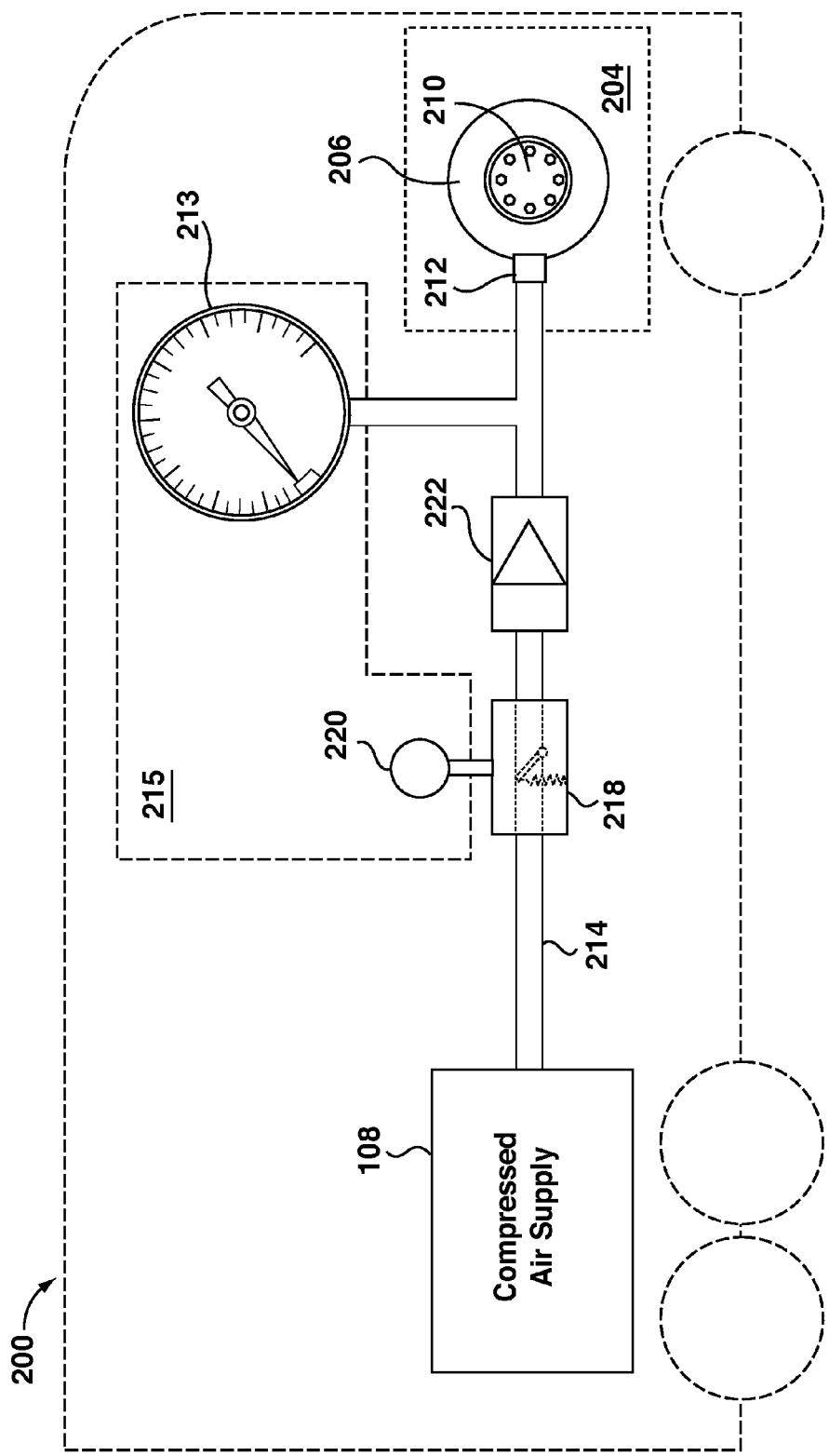
FIG. 7A shows a schematic representation of a motor coach bus having a spare tire inflation system according to an aspect of the present invention, with a valve in a first position.
Figure 7B:
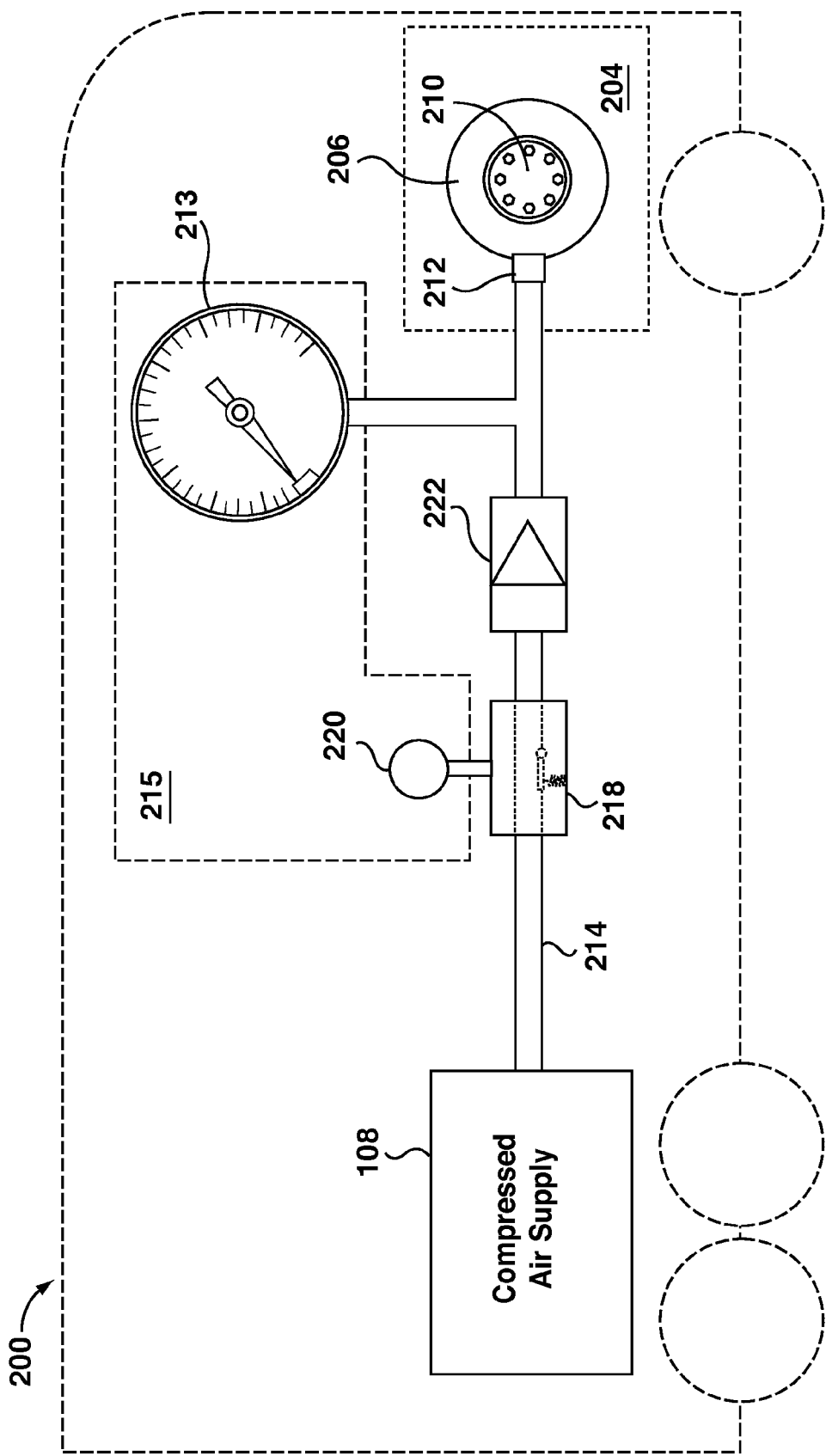
FIG. 7B shows the schematic representation of FIG. 7A, with the valve in a second position.

As shown schematically in FIGS. 7A and 7B, the spare tire 206 is mounted on a wheel 210 and is disposed within the spare tire compartment 204 of the motor coach bus 200. As is conventionally known, the spare tire 206 has an inlet valve 212 for inflating the spare tire 206. The inlet valve of 212 of the spare tire is in fluid communication with a pressure indicator 213, which may be mechanical or electronic and whose display is preferably positioned inside a cabin 215 of the motor coach bus 200 so as to be visible from the driver's seat.

The compressed air supply system 108 of the motor coach bus 200 is connected by way of a tire inflation fluid communication path 214 to the inlet valve 212 of the spare tire 206. The tire inflation fluid communication path 214 is governed by a tire inflation valve 218 that is movable between a closed position obstructing the tire inflation fluid communication path 214 (as shown in FIG. 7A) and an open position permitting airflow through the tire inflation fluid communication path 214 (as shown in FIG. 7B). The tire inflation valve 218 is biased into the closed position. While the tire inflation valve 218 is shown schematically in FIGS. 7A and 7B as a spring-biased movable redirection plate, this is merely for ease of illustration, and any suitable valve may be used. A tire inflation valve controller 220 is operably coupled to the tire inflation valve 208 for moving the tire inflation valve between the closed position and the open position. The tire inflation valve controller 220 may be a mechanical controller which physically changes the position of the tire inflation valve 218 by way of a mechanical linkage, or it may be an electronic or electromechanical controller which transmits a signal to one or more valve actuators that change the position of the tire inflation valve 218 in response to the signal from the controller 102. Preferably, the tire inflation valve controller 220 also is positioned inside the cabin 215 of the motor coach bus 200 so as to be accessible from the driver's seat. Still more preferably, the tire inflation valve controller 220 and the display of the pressure indicator 213 are adjacent to one another inside the cabin 215. Thus, an operator is able to check the pressure of the spare tire 206 and, if necessary, add air to the spare tire 206, from the driver's seat. In addition, because the connection to the inlet valve 212 of the spare tire 206 will typically be maintained in an open position by the connection to the tire inflation fluid communication path 214 (typically comprising suitable hose), a one-way valve 222 is interposed in the tire inflation fluid communication path 214 to prevent deflation of the spare tire 206 (e.g. when the compressed air supply 108 is inactive because the motor coach bus has been turned off).

It is also within the contemplation of this invention that visual pressure indicator 213 and the manual tire inflation valve controller 220 may be replaced with an automated system which detects when pressure in the spare tire 206 falls below a first predetermined threshold, and in response to such detection, opens the tire inflation valve 218 until the pressure in the spare tire 206 is increased to a second predetermined threshold, and then closes the tire inflation valve 218.

The use of pneumatic components as primary actuators and as latch actuators has been described as a preferred embodiment because pneumatic components can advantageously be integrated with the compressed air supply systems on existing motor coach buses. Suitable hydraulic cylinders, suitable solenoid arrangements, and other types of actuators may be substituted for the illustrated pneumatic components and integrated with appropriate controls, without departing from the scope of the present invention.

One or more currently preferred embodiments have been described by way of example. It will be apparent to persons skilled in the art that a number of variations and modifications can be made without departing from the scope of the invention as defined in the claims.

What is claimed is:

1. A bumper mounting assembly, comprising:
a support member mountable to a vehicle front;
a bumper-carrying member, the bumper-carrying member comprising a bumper-mounting portion and a spacer portion;
the spacer portion of the bumper-carrying member being hingedly mounted to the support member so that the bumper-carrying member is movable between an upright position and a lowered position, relative to the support member;
the bumper-mounting portion being spaced from the support member when the bumper-carrying member is in the upright position;
a primary actuator secured to the support member and the bumper-carrying member;
the primary actuator being at least selectively operable to apply braking force against movement of the bumper-carrying member from the upright position to the lowered position;
one of the bumper-carrying member and the support member carrying a detent;
the other of the bumper-carrying member and the support member movably carrying a latch so that the latch is movable between an engagement position and a disengagement position relative to the detent so that the latch can selectively engage and disengage from the detent and thereby selectively retain the bumper-carrying member in the upright position and release the bumper-carrying member from the upright position;
the latch being biased into the engagement position;
the other of the bumper-carrying member and the support member carrying a latch actuator coupled to the latch for selectively moving the latch between the engagement position and the disengagement position.

2. The bumper mounting assembly of claim 1, wherein the primary actuator is selectively operable to move the bumper-carrying member from the lowered position to the upright position.

3. The bumper mounting assembly of claim 2, further comprising a switching mechanism operably coupled to the primary actuator and to the latch actuator to selectively reduce resistance of the primary actuator to movement of the bumper-carrying member from the upright position to the lowered position while causing the latch actuator to move the latch to the disengagement position.

4. The bumper mounting assembly of claim 3, wherein:
the primary actuator is a pneumatic cylinder pivotally secured at a first end thereof to the support member and at a second end thereof to the bumper-carrying member;
the latch actuator is a pneumatic spring cylinder biased into an extended configuration;
the pneumatic cylinder has a pneumatic cylinder gas flow port and resists extension when its barrel is sufficiently pressurized;
the pneumatic spring cylinder has a pneumatic spring cylinder gas flow port and resists retraction when its barrel is insufficiently pressurized and moves into a retracted configuration while its barrel is sufficiently pressurized;
the pneumatic cylinder gas flow port has a first fluid communication path connectible to a source of compressed gas;
the pneumatic cylinder gas flow port communicates with the pneumatic spring cylinder gas flow port through a second fluid communication path; and
the switching mechanism is operable to selectively switch between:
(a) permitting gas flow through the first fluid communication path into the pneumatic cylinder gas flow port while obstructing gas flow from the pneumatic cylinder gas flow port through the second fluid communication path to the pneumatic spring cylinder gas flow port; and
(b) obstructing gas flow through the first fluid communication path into the pneumatic cylinder gas flow port while permitting gas flow from the pneumatic cylinder gas flow port through the second fluid communication path to the pneumatic spring cylinder gas flow port.

5. The bumper mounting assembly of claim 4, further comprising an adjustable vent on the second fluid communication path.

6. The bumper mounting assembly of claim 4, wherein:
when the bumper-carrying member is in the upright position, the bumper-mounting portion is substantially parallel to the support member; and
when the bumper-carrying member is in the lowered position, the bumper-mounting portion is substantially perpendicular to the support member.

7. The bumper mounting assembly of claim 6, wherein:
when the bumper-carrying member is in the upright position, the pneumatic cylinder and the pneumatic spring cylinder are disposed between the bumper-carrying member and the support member.

8. The bumper mounting assembly of claim 7, wherein:
the detent is carried by the bumper-carrying member; and
the latch and the latch actuator are carried by the support member.

* * * * *